Patented July 2, 1929.

1,719,567

UNITED STATES PATENT OFFICE.

HENRY B. SLATER, OF RIVERSIDE, CALIFORNIA, ASSIGNOR TO W. B. CLANCY, W. A. JOHNSON, AND GEORGE A. SARAU, TRUSTEES, OF RIVERSIDE, CALIFORNIA.

PROCESS OF TREATING FRESH FRUIT FOR THE MARKET.

No Drawing.   Application filed July 28, 1925.  Serial No. 46,656.

This invention relates to a process of treating fresh fruit for the market, and refers particularly to a process intended to effect an improved appearance of the marketed fruit, while simultaneously preventing excess shrinkage of the fruit without entirely interfering with the necessary respiration of the fruit.

The juice of citrus fruit consists largely of citric acid and sugars (glucose and fruitose). These sugars and acid keep on continually reacting to form carbon dioxide which normally escapes from the fruit. If this carbon dioxide is prevented from escaping, it increases the decomposition reaction and the fruit becomes watery, charged with carbon dioxide gas and bloated in appearance.

Hitherto, citrus fruit has been treated with materials such as paraffin wax to improve the appearance of the fruit and to check evaporation of the water content of the fruit. Fresh citrus fruit, prior to its marketing, is generally passed through an alkaline soaking tank to free the deposit of dirt thereon subsequent to which the fruit is commonly brushed. The passage of the fruit through such soaking tank leaches therefrom a considerable quantity of the natural oil in the skin of the fruit, and the consequence of such treatment is that the fruit, upon marketing, possesses a dull, unattractive appearance. Moreover, the removal of such oil from the fruit facilitates evaporization of moisture from the fruit, thus promulgating a rapid drying and shrinkage thereof.

A treatment of fruits, such as citrus fruits with paraffin wax, has, heretofore, to a slight extent, been carried on to restore the fruit to a fresh, shiny appearance, while providing a protection to the fruit against rapid evaporization and shrinkage. The result of such paraffin treatment of fruit has been unsatisfactory in that paraffin wax has not only prevented evaporation of moisture content of the fruit, but has impeded the necessary breathing or respiration of the fruit with the result that the fruit rapidly becomes watery, charged with carbon dioxide and bloated. Moreover, the paraffin covering did not remain long upon the fruit without cracking and giving a streaked and poor appearance.

It is an object of the present invention to provide a method of treating fresh fruit for the market which will provide merely a thin covering material for the fruit which is adapted to preserve the appearance of the fruit and prevent over rapid evaporation of moisture content from the fruit through replacement in the fruit of oil where the natural oil of the fruit has been leached out by the process of washing or otherwise treating the fruit for the market.

With the process of the present invention the fruit is impregnated with a substitute for the natural oil of the fruit only to the extent of restoring the fruit to a natural, bright appearance, restoring oil in the skin of the fruit to the extent which will prevent excess evaporation of moisture content from the fruit without interfering entirely with the necessary respiration of the fruit, and thus providing a process which does not promulgate watering of the fruit.

The invention is adapted for use also in connection with a process of sterilizing the fruit against deteriorating fungus growth for the prevention of decay such, for example, as described in my copending application Ser. No. 538,860, filed February 21, 1922, and my application for process of treating fresh fruit for retarding decay from blue and green mold, Ser. No. 46,655, filed July 28, 1925, or in connection with any other process of subjecting fresh fruit to a material adapted to effect sterilization of the fruit.

The invention is particularly valuable in connection with processes of this character which not only result in an increased leaching of the natural oil from the fruit, but tend to leave deposits of the sterilizing material upon the fruit, thus imparting to the fruit a dull and streaked appearance.

Various other objects and advantages of this present invention will be apparent from the description of the preferred process of treating fruit, embodied in the present invention.

In accordance with the process of the present invention, citrus fruit is first passed through a washing solution of material adapted to loosen and remove the dirt and scale which deposits upon the fruit in the orchard, such as a sodium carbonate or caustic soda solution, and then passed through brushes wherein the scale and dirt are thoroughly removed from the fruit. Subsequently the fruit may be rinsed and dried or passed through a solution to sterilize the fruit such, for example, as the sterilizing solution described in either of my aforesaid applications, and then, without rinsing all of the disinfecting solution from the fruit, the fruit is preferably dried.

The initial washing of the fruit, and sterilization of the fruit, if the latter is carried out, results in leaching of the natural oil from the skin of the fruit and the next step of the process involves the impregnation into the skin of sufficient non-volatile oil to replace the thus lost natural oil. That is, in accordance with the present invention, there is then applied to the fruit, in a suitable manner, an oil which will not become rancid and is not subject to decay, in order to replace this natural oil and restore approximately the natural appearance and condition of the fruit. The oil may be applied to the fruit in any of a number of different methods, such, for instance, as by passing the fruit through the oil, or spraying the oil on the fruit, or by bringing the fruit in contact with a substance saturated with oil, such as an oil saturated cloth. The excess oil then may be removed by wiping or in any other suitable manner so that there remains upon the surface of the fruit a very microscopic film only of the oil. The oil employed is preferably mineral or petroleum oil; for the best results as to appearance, etc. I prefer to employ viscous fractions of petroleum oil which have been freed from all unsaturated compounds, oils of this character being commonly known and sold as medicinal oils, although for the purpose of this invention such complete purity of the oil is not generally required.

To such an oil may, if desired, be added a quantity of wax, such as paraffin wax, although the addition of such wax is not necessary. In all cases the oil employed is substantially non-volatile under ordinary atmospheric conditions so that all the oily material applied to the fruit will remain with the fruit during the process of marketing the fruit and thus serves to retain in the fruit its natural characteristics.

The addition of this viscous non-volatile mineral or petroleum oil in this manner, restores to the fruit a bright and pleasing appearance by reason of replacing the natural oil of the fruit, and thus prevents excess evaporation and drying and shrinkage of the fruit without entirely interfering with the respiration of the fruit. Moreover, the material applied to the fruit will not crack or streak on use and destroy or detract from the appearance or character of the fruit in any manner, as occurs with the prior known processes involving covering the fruit with a coating of wax.

While the process herein described is well adapted for accomplishing the objects of the present invention, it is understood that various modifications may be made without departing from the principles of the invention, and the invention includes all of such modifications and changes as come within the scope of the appended claims.

I claim:

1. The process of treating citrus fruit, which comprises applying to the fruit a material consisting substantially of a non-volatile oil to replace part of the natural oil of the skin of the fruit.

2. The process of treating citrus fruit, which comprises applying to the fruit a material consisting substantially of a non-volatile mineral oil to replace part of the natural oil of skin of the fruit.

3. The process of treating citrus fruit, which comprises washing the fruit in an alkaline solution, later drying the fruit, and replacing the natural oil of the skin, which has been leached from the fruit, with a non-volatile mineral oil.

4. The process of treating citrus fruit, which comprises washing the fruit in an alkaline solution, passing the fruit through a fungicidal solution, drying the fruit, and replacing the oil leached from the fruit with a non-volatile mineral oil.

5. A process as in claim 1, in which the oil is mineral oil substantially freed from unsaturated compounds.

6. A process as in claim 2, in which the oil is mineral oil substantially freed from unsaturated compounds.

7. A process as in claim 3, in which the oil is mineral oil substantially freed from unsaturated compounds.

8. A process as in claim 4, in which the oil is mineral oil substantially freed from unsaturated compounds.

Signed at Los Angeles, California, this 22nd day of July 1925.

HENRY B. SLATER.